(12) United States Patent
Chen

(10) Patent No.: US 10,684,423 B2
(45) Date of Patent: *Jun. 16, 2020

(54) HIGH-DENSITY FIBER OPTIC CONNECTOR

(71) Applicant: EZCONN CORPORATION, Taipei (TW)

(72) Inventor: Szu Ming Chen, New Taipei (TW)

(73) Assignee: EZconn Corporation, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,781

(22) Filed: Apr. 4, 2019

(65) Prior Publication Data

US 2019/0235175 A1 Aug. 1, 2019

Related U.S. Application Data

(63) Continuation of application No. 15/911,054, filed on Mar. 2, 2018, now Pat. No. 10,295,758.

(30) Foreign Application Priority Data

Mar. 3, 2017 (TW) .............................. 106203020 A

(51) Int. Cl.
*G02B 6/38* (2006.01)

(52) U.S. Cl.
CPC .......... *G02B 6/387* (2013.01); *G02B 6/3825* (2013.01); *G02B 6/3851* (2013.01); *G02B 6/3879* (2013.01); *G02B 6/3893* (2013.01); *G02B 6/3887* (2013.01); *G02B 6/3898* (2013.01)

(58) Field of Classification Search
CPC .... G02B 6/387; G02B 6/3879; G02B 6/3825; G02B 6/3851; G02B 6/3893; G02B 6/3887; G02B 6/3898
See application file for complete search history.

(56) References Cited

U.S. PATENT DOCUMENTS 10,295,758 B2 * 5/2019 Chen ..................... G02B 6/387
2017/0285275 A1 * 10/2017 Hill ..................... G02B 6/3826

* cited by examiner

*Primary Examiner* — John Bedtelyon

(57) ABSTRACT

A high-density fiber optic connector configured to operate with a first optical fiber cable, a second optical fiber cable, and a dual fiber optic cable adapter, is provided. The high-density fiber optic connector comprises a two-piece connector housing configured to open and close and form first and second housing through ports, first and second sub-assembly housings, and a push-pull tab. When the two-piece connector housing is opened, the first and second sub-assembly housings can be manually interchanged, such that the first sub-assembly housing is engaged and fixed in the second housing through port and a front end thereof is coupled to a second receiving port of the dual fiber optic cable adapter and the second sub-assembly housing is engaged and fixed in the first housing through port and a front end thereof is coupled to a first receiving port of the dual fiber optic cable adapter.

20 Claims, 14 Drawing Sheets

HIGH-DENSITY FIBER OPTIC CONNECTOR

RELATED APPLICATIONS

The present application is a continuation application of U.S. nonprovisional application Ser. No. 15/911,054, filed on Mar. 2, 2018, which in turn claims priority to Taiwan application no. 106203020, filed on Mar. 3, 2017, each of which is hereby incorporated by reference in its entirety.

BACKGROUND OF THE INVENTION

Field of the Invention

The invention relates to high-density fiber optic connectors.

Description of the Related Art

Optical fiber is increasingly being used for a variety of applications, including, but not limited to, broadband voice, video, and data transmission. Benefits of optical fiber use include extremely wide bandwidth and low noise operation. With the increasing and varied use of optical fibers, it is important to provide efficient methods of interconnecting optical fibers. High density fiber optic connectors have been developed for this purpose.

In an example, FIG. 1 is a perspective view illustrating a prior art high-density fiber optic connector, FIG. 2A is a cross-sectional view illustrating a portion of a prior art high-density optical fiber connector attached to a dual fiber optic cable adapter, having a push-pull tab hook portion connected to a latch of a lever, and FIG. 2B is a cross-sectional view illustrating a front end of a cable boot of the prior art high-density fiber optic connector of FIG. 2A attached to a dual fiber optic cable adapter, illustrating downward attachment of the push-pull tab hook portion when connecting to the latch of the lever. As shown in FIGS. 1, 2A, and 2B, a high-density fiber optic connector 10 comprises a connector housing 11 configured to encompass two fiber optic cables therein and connected to two sub-assembly housings 12, respectively. The two sub-assembly housings 12 are respectfully connected to the connector housing 11, at back ends thereof. A push-pull tab 17 having hook portions 18 on a front end thereof is disposed on the connector housing 11. The sub-assembly housings 12 comprise levers 16 having latches 19 on end portions thereof, respectively. The hook portions 19 of the push-pull tab 17 connect with the latches 19 of the sub-assembly housings 12 for pulling thereof.

However, during usage, a large pulling force is required to horizontally move the push-pull tab 17, due to the movement for operation of the latch 19 by the hook portion 18 of the push-pull tab 17. Referring to FIG. 2B, as shown, when a pulling force is generated to move the push-pull tab 17, little force is generated in the P1 and P4 force directions. Additionally, it is inefficient and inconvenient to interchange the sub-assembly housings due to attachment means of the sub-assembly housings 12 to the connector housing 11. For example, but not to be limiting, use of inverted clamped structures, which require tools for removal of and interchanging the sub-assembly housings 12.

There is demand for high-density fiber optic connectors to solve the aforementioned problems.

BRIEF SUMMARY OF THE INVENTION

High-density fiber optic connectors are provided.

In an embodiment, a high-density fiber optic connector configured to operate with a first optical fiber cable, a second optical fiber cable, and a dual fiber optic cable adapter, is provided. In an embodiment, the high-density fiber optic connector comprises a two-piece connector housing having an upper connector housing and a lower connector housing. The upper and lower connector housings are rotatably connected at two opposite back side ends thereof, respectively, to open and close. When closed, the upper and lower connector housings form a first housing through port and a second housing through port at front ends thereof to accommodate the first and second optical fiber cables extending therein and therethrough, respectively. The high-density fiber optic connector further comprises a first sub-assembly housing. The first sub-assembly housing is engaged and fixed in the first housing through port, wherein a back end thereof is coupled to and connected to the first optical fiber cable, and wherein a front end thereof is coupled to and connected to a first receiving port of the dual fiber optic cable adapter. The high-density fiber optic connector further comprises a second sub-assembly housing. The second sub-assembly housing is engaged and fixed in the second housing through port, wherein a back end thereof is coupled to and connected to the second optical fiber cable, and wherein a front end thereof is coupled to and connected to a second receiving port of the dual fiber optic cable adapter.

In an embodiment, when the lower connector housing is facing upward and rotatably opened, the first and second sub-assembly housings can be manually interchanged, such that the first sub-assembly housing is engaged and fixed in the second housing through port and a front end thereof is coupled to and connected to the first receiving port of the dual fiber optic cable adapter, and the second sub-assembly housing is engaged and fixed in the first housing through port and a front end thereof is coupled to and connected to the first receiving port of the dual fiber optic cable adapter.

In an embodiment the high-density fiber optic connector further comprises a cable boot having a front attachment end extending from a front end thereof and a boot end extending from a back end thereof, wherein the front attachment end of the cable boot is slidably connected to the two-piece connector housing. In an embodiment, the two-piece connector housing further comprises a first upper housing runner and a first lower housing runner on one side thereof, and a second upper housing runner and a second lower housing runner on an opposite side thereof. In an embodiment, the front attachment end comprises a first lateral arm on one side thereof and a second lateral arm on an opposite side thereof, and the first lateral arm comprises a first upper edge rail and a first lower edge rail on an inner wall surface thereof, and the second lateral arm comprises a second upper edge rail and a second lower edge rail on an inner wall surface thereof. The front attachment end of the cable booth is slidably connected to the two-piece connector housing, securing shut the upper and lower connector housings of the two-piece connector housing. In an embodiment, the front attachment end is U-shaped.

In an embodiment, the first sub-assembly housing comprises a first housing body and the second sub-assembly housing comprises a second housing body, wherein the first and second housing bodies comprise first and second housing levers disposed on forward top surfaces thereof, flaring backward therefrom, respectively, having first and second housing latches, both horizontally disposed across front ends of first and second lever grooves, respectively, and having first and second structural protrusions disposed on back ends thereof, respectively. The first and second housing latches, first and second lever grooves, and first and second structural protrusions are suspended above back top surfaces of the first and second housing bodies, respectively, and are flexible, wherein the first housing latch is positioned within one of a plurality of adaptor latch orifices of the dual fiber optic cable adapter and the second housing latch is positioned within another of a plurality of adaptor latch orifices of the dual fiber optic cable adapter. In an embodiment, when a downward pushing force pushes the first and second structural protrusions downward, the first and second housing latches are retracted down from the plurality of adaptor latch orifices, respectively, to detach the first and second sub-assembly housings from the dual fiber optic cable adaptor. In an embodiment, the high-density fiber optic connector further comprises a push-pull tab engaged and fixed to a top surface of the two-piece connector housing, comprising a first rectangular guide opening and a second rectangular guide opening disposed on front top side ends thereof, respectively, wherein the first and second structural protrusions protrude upward and outward through the first and second rectangular guide openings, respectively. In an embodiment, when a horizontal pulling force is applied to and then released from the push-pull tab in a backward direction, a downward pushing force pushing the first and second structural protrusions downward is generated, pushing the first and second housing latches and the first and second structural protrusions downward before snapping back upward, due to upward elastic forces of the flared ends of the first and second housing levers. In an embodiment, the push-pull tab further comprises a first support protrusion and a second support protrusion, disposed on opposite front side ends thereof, wherein the first and second support protrusions sit on top back edges of the first and second lever grooves, respectively, such that when a horizontal pulling force is applied to the push-pull tab in a backward direction, the first and second support protrusions push down on the top back edges of the first and second lever grooves, respectively, moving the first and second lever grooves and the first and second structural protrusions downward, respectively.

In an embodiment, the upper connector housing comprises a flexible latch disposed on a top surface thereof, wherein a bottom portion area thereof is disposed on a top portion of the upper connector housing and a flexible curved overhang portion is suspended above the bottom portion area, and wherein a front bottom edge end of the flexible curved overhang portion of the flexible latch is in direct contact with the top ends of the first and second structural protrusions of the first and second housing levers, respectively, such that when a pushing force is applied to the flexible latch the first and second structural protrusions are moved downward.

In an embodiment, the two-piece connector housing further comprises a positioning guide, disposed on a top surface thereof, slidably connected within an oval opening of the push-pull tab, wherein the maximum length of the oval opening is larger than the maximum length of the positioning guide.

In an embodiment, the positioning guide comprises side protrusions on each longitudinal side thereof, having side protrusion hooks disposed on upper edges thereof, protruding horizontally thereout, respectively, engaging and fixing with the oval opening of the push-pull tab, wherein the push-pull tab controls horizontal forward and backward movement of the two-piece connector housing.

In an embodiment, the first and second optical fiber cables are disposed through the two-piece connector housing and first sub-assembly housing and second sub-assembly housing, respectively, and the two-piece connector housing further comprises two spacing guides, centrally disposed near longitudinal side ends thereof, to assure a predetermined length of the first optical fiber cable and second optical fiber cable when being manually assembled or interchanged.

In an embodiment, the push-pull tab further comprises a handle having an indicator area disposed on a back side end thereof.

In another embodiment, a high-density fiber optic connector configured to operate with a first optical fiber cable, a second optical fiber cable, and a dual fiber optic cable adapter, is provided. In an embodiment, the high-density fiber optic connector comprises a first sub-assembly housing having a first housing body, wherein the first housing body comprises a first housing lever disposed on a forward top surface thereof, flaring backward therefrom, having a first structural protrusion disposed on a back end thereof, wherein the first structural protrusion is suspended above a back top surface of the first housing body and is flexible. The high-density fiber optic connector further comprises a second sub-assembly housing having a second housing body, wherein the second housing body comprises a second housing lever disposed on a forward top surface thereof, flaring backward therefrom, having a second structural protrusion disposed on a back end thereof, wherein the second structural protrusion is suspended above a back top surface of the second housing body and is flexible. The high-density fiber optic connector further comprises a two-piece connector housing having a first housing through port and a second housing through port formed at a front end thereof, wherein the first and second sub-assembly housings are engaged and fixed in the first and second housing through ports, respectively. The high-density fiber optic connector further comprises a push-pull tab engaged and fixed to a top surface of the two-piece connector housing, comprising a first rectangular guide opening and a second rectangular guide opening disposed on front top side ends thereof. The first and second structural protrusions protrude upward and outward through the first and second rectangular guide openings, respectively, such that when a horizontal pulling force is applied to the push-pull tab in a backward direction, the first and second structural protrusions are pushed downward to the first and second housing through ports of the two-piece connector housing. In an embodiment, the two-piece connector housing further comprises an upper connector housing and a lower connector housing, wherein the upper and lower connector housings are rotatably connected at two opposite back side ends thereof, respectively, to open and close and form the first and second housing through ports having the first and second sub-assembly housings engaged and fixed therein, respectively. In an embodiment, when the lower connector housing is facing upward and rotatably opened, the first and second sub-assembly housings can be manually interchanged, such that the first sub-assembly housing is engaged and fixed in the second housing through port and the second sub-assembly housing is engaged and fixed in the first housing through port, respectively. In an embodiment, the two-piece connector housing further comprises a first front housing recess and a second front housing recess in the first and second housing through ports, respectively, receiving a first connection end and a second connection end of the first and second sub-assembly housings, respectively, therein. In an embodiment, the high-density fiber optic connector further comprises a cable boot having a front attachment end extending from a front end thereof and a boot end extending from a back end thereof, wherein the front attachment end of the cable boot is slidably connected to the two-piece connector housing.

In an embodiment, the two-piece connector housing further comprises a first upper housing runner and a first lower housing runner on one side thereof, and a second upper housing runner and a second lower housing runner on an opposite side thereof, wherein the front attachment end of the cable booth is slidably connected thereto, thereby.

In an embodiment, the front attachment end is U-shaped and has a first lateral arm on one side thereof and a second lateral arm on an opposite side thereof, and the first lateral arm comprises a first upper edge rail and a first lower edge rail on an inner wall surface thereof, and the second lateral arm comprises a second upper edge rail and a second lower edge rail on an inner wall surface thereof, wherein the front attachment end of the cable booth is slidably connected to the two-piece connector housing thereby.

In an embodiment, the first housing lever further comprises a first housing latch and the second housing lever further comprises a second housing latch, both horizontally disposed across front ends of the first and second lever grooves, respectively, wherein the first housing latch is positioned within one of a plurality of adaptor latch orifices of the dual fiber optic cable adapter and the second housing latch is positioned within another of a plurality of adaptor latch orifices of the dual fiber optic cable adapter, and wherein when a downward pushing force pushes the first and second structural protrusions downward, the first and second housing latches are retracted down from the plurality of adaptor latch orifices, respectively, to detach the first and second sub-assembly housings from the dual fiber optic cable adaptor.

In an embodiment, the first and second optical fiber cables are disposed through the two-piece connector housing and first sub-assembly housing and second sub-assembly housing, respectively, and the upper connector housing further comprises two spacing guides, centrally disposed near longitudinal side ends thereof, to assure a predetermined length of the first optical fiber cable and second optical fiber cable when being manually assembled or interchanged.

In an embodiment, the two-piece connector housing further comprises a positioning guide, disposed on a top surface thereof, slidably connected within an oval opening of the push-pull tab, wherein the maximum length of the oval opening is larger than the maximum length of the positioning guide. The positioning guide comprises side protrusions on each longitudinal side thereof, having side protrusion hooks disposed on upper edges thereof, protruding horizontally thereout, respectively, engaging and fixing with the oval opening of the push-pull tab, wherein the push-pull tab controls horizontal forward and backward movement of the two-piece connector housing.

In an embodiment, the push-pull tab further comprises a handle having an indicator area disposed on a back side end thereof.

In an embodiment, the first and second housing levers further comprise a first and second lever groove disposed aside the first and second structural protrusions, respectively, and the push-pull tab further comprises a first support protrusion and a second support protrusion, disposed on opposite front side ends thereof, wherein the first and second support protrusions sit on top back edges of the first and second lever grooves, respectively, such that when a horizontal pulling force is applied to the push-pull tab in a backward direction, the first and second support protrusions push down on the top back edges of the first and second lever grooves, respectively, moving the first and second lever grooves and the first and second structural protrusions downward, respectively.

In the embodiments, a slight pushing force or pulling force is required to horizontally move the handle of the push-pull tab, due to the same direction of movement for operation of the support protrusions and rectangular guide openings. In other embodiments, the design of the side walls of the rectangular guide openings may further facilitate disengagement of the structural protrusions therefrom when the support protrusions are pressed downward. Additionally, in the embodiments, efficiency is increased as both of the sub-assembly housings are manually interchangeable. As an example, but not to be limiting, an originally configured fiber optic signal transmission terminal can be reconfigured to be a fiber optic signal receiving terminal and an originally configured fiber optic signal receiving terminal can be reconfigured to be a fiber optic signal transmission terminal.

These, as well as other components, steps, features, benefits, and advantages of the present application, will now made clear by reference to the following detailed description of the embodiments, the accompanying drawings, and the claims.

BRIEF DESCRIPTION OF THE DRAWINGS

The accompanying drawings, which are incorporated herein and form a part of the Detailed Description of the Invention, illustrate various embodiments of the present invention and, together with the Detailed Description of the Invention, serve to explain principles discussed below. The drawings referred to in this Brief Description of Drawings should not be understood as being drawn to scale unless specifically noted.

DETAILED DESCRIPTION OF THE INVENTION

Figure 1:
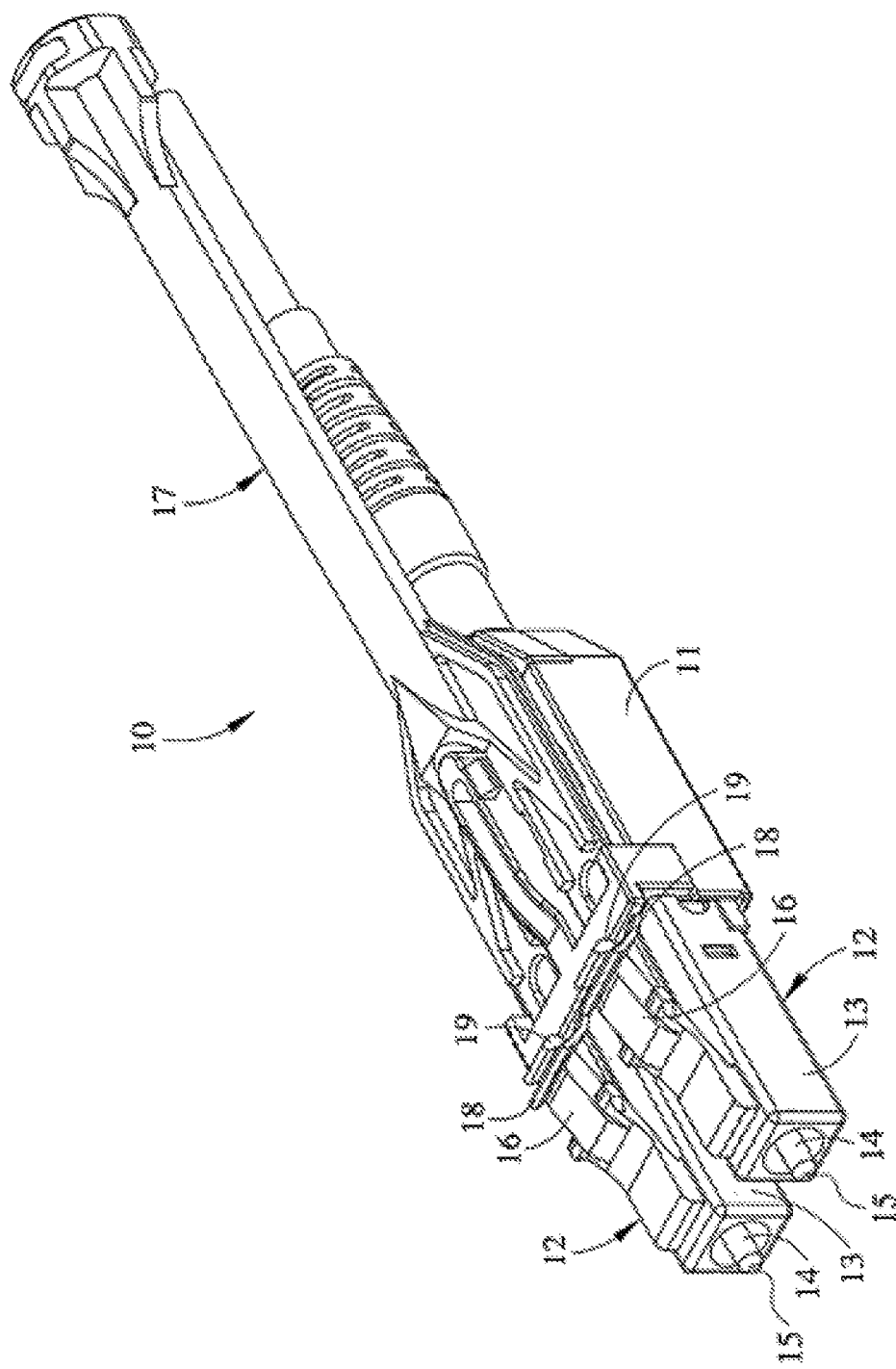
FIG. 1 is a perspective view illustrating a prior art high-density fiber optic connector.
Figure 2A:
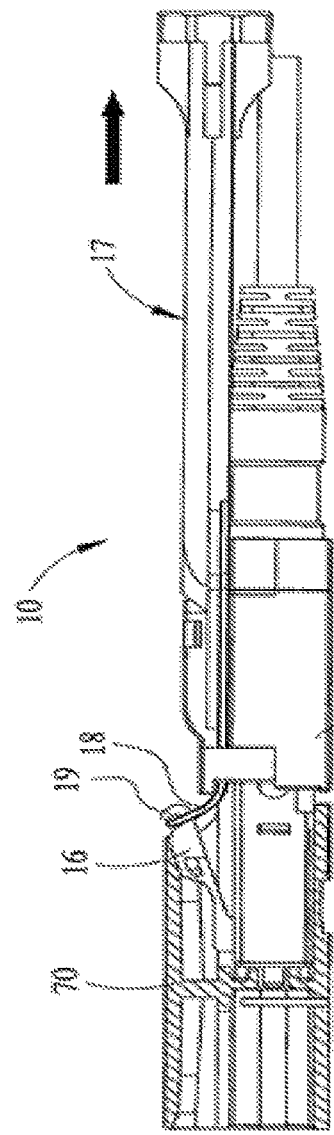
FIG. 2A is a cross-sectional view illustrating a portion of a prior art high-density optical fiber connector attached to a dual fiber optic cable adapter, having a push-pull tab hook portion connected to a latch of a lever.
Figure 2B:
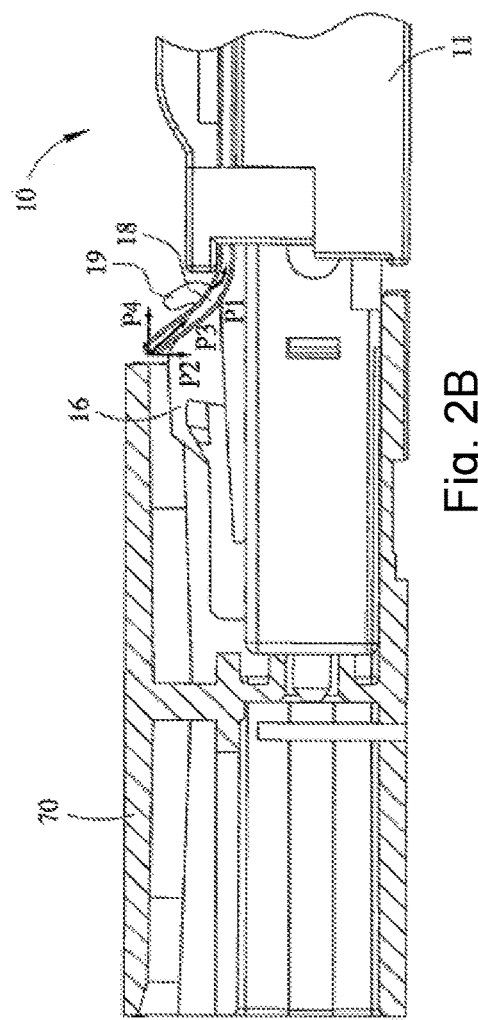
FIG. 2B is a cross-sectional view illustrating a front end of a cable boot of the prior art high-density fiber optic connector of FIG. 2A attached to a dual fiber optic cable adapter, illustrating downward attachment of the push-pull tab hook portion when connecting to the latch of the lever.

It is understood that the following disclosure provides many different embodiments, or examples, for implementing different features of the invention. Specific examples of devices and arrangements are described below to simplify the present disclosure. These are, of course, merely examples and are not intended to be limiting. For example, the formation of a first feature over or on a second feature in the description that follows can include embodiments in which the first and second features are formed in direct contact, and can also include embodiments in which additional features are formed between the first and second features, such that the first and second features are not in direct contact. In addition, the present disclosure can repeat reference numerals and/or letters in the various examples. This repetition is for the purpose of simplicity and clarity and does not in itself dictate a relationship between the various embodiments and/or configurations discussed. It is intended that the scope of the present technology be defined by the claims appended hereto and their equivalents.

Figure 3:
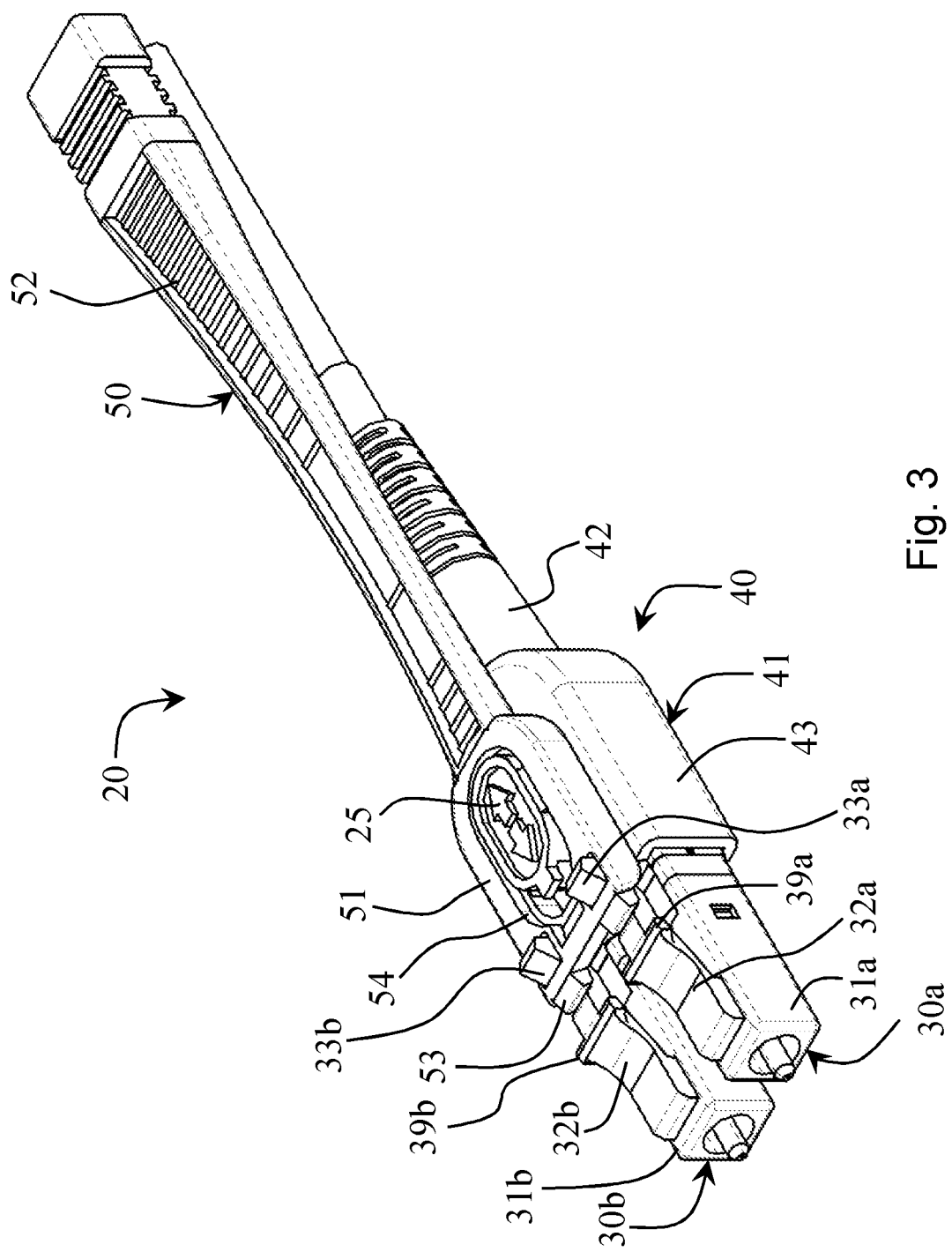
FIG. 3 is a perspective view illustrating a high-density fiber optic connector according to various embodiments.
Figure 4:
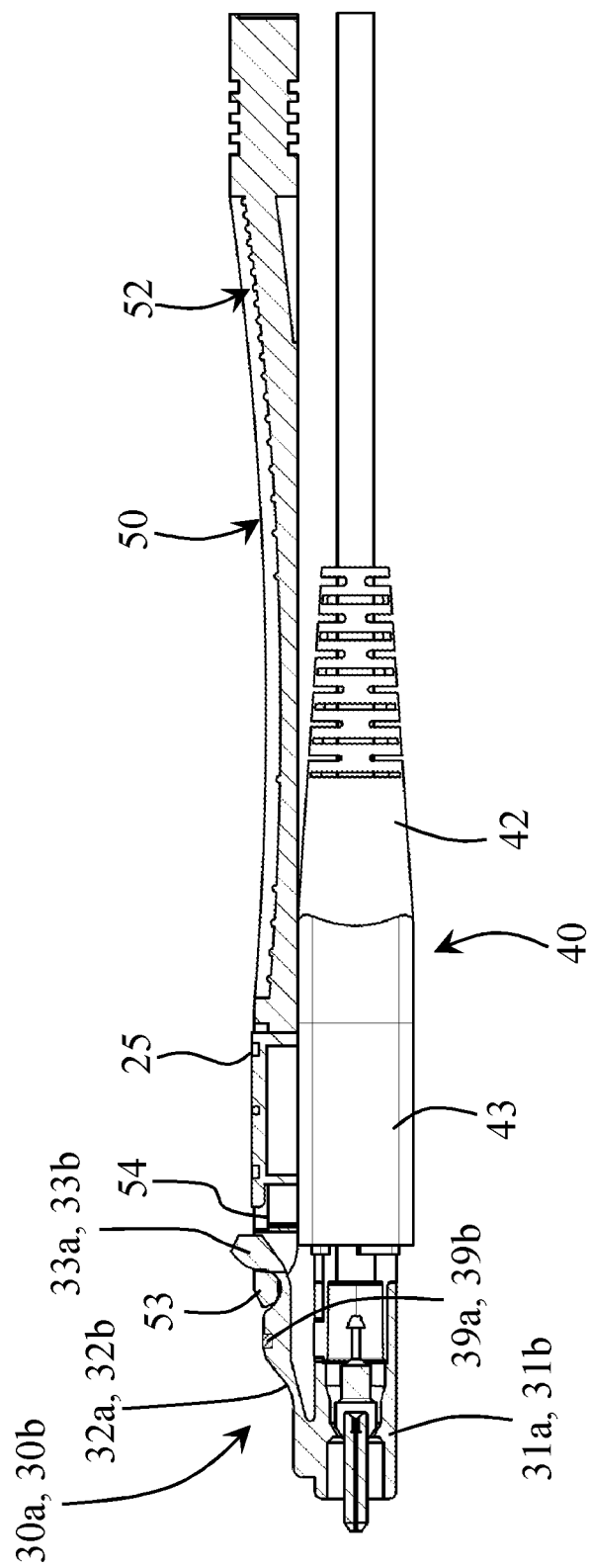
FIG. 4 is a cross-sectional view illustrating a high-density fiber optic connector according to various embodiments.
Figure 5:
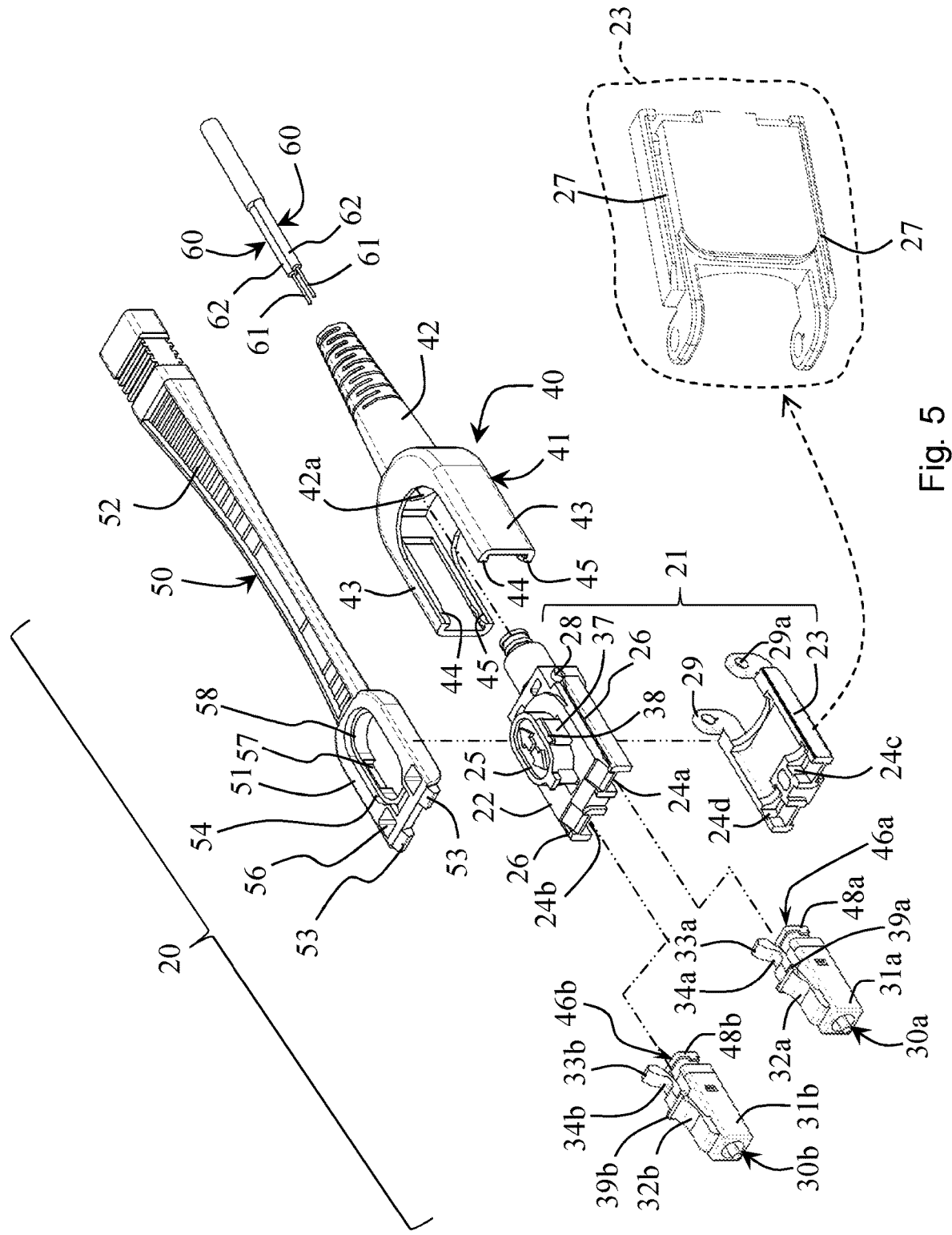
FIG. 5 is an exploded view illustrating a high-density fiber optic connector according to various embodiments.
Figure 7A:
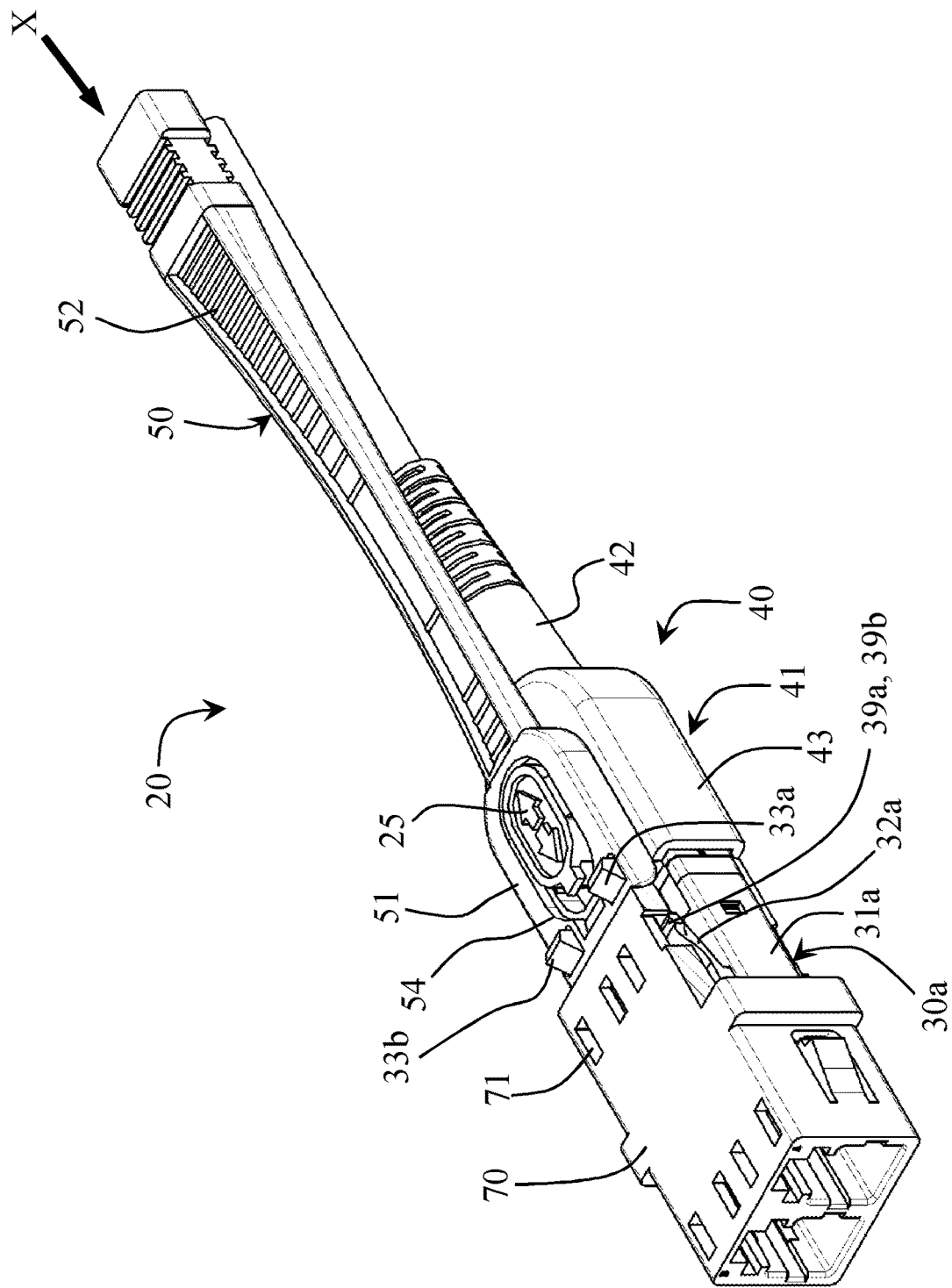
FIG. 7A is a perspective view illustrating a high-density fiber optic connector, illustrating attachment of the push-pull tab when connecting to housing levers according to various embodiments.

FIG. 3 is a perspective view illustrating a high-density fiber optic connector according to various embodiments. FIG. 4 is a cross-sectional view illustrating a high-density fiber optic connector according to various embodiments. FIG. 5 is an exploded view illustrating a high-density fiber optic connector according to various embodiments. FIG. 7A is a perspective view illustrating a high-density fiber optic connector, illustrating attachment of the push-pull tab when connecting to housing levers according to various embodiments. As shown in FIGS. 3-5, and referring to FIG. 7A, in an embodiment, a high-density fiber optic connector 20 can be configured for connection of two buffered optical fibers 60 in a high-density optical fiber system comprising a dual fiber optic cable adapter 70. In an embodiment, a high-density fiber optic connector 20 comprises a two-piece connector housing 21, two sub-assembly housings 30a, 30b, a cable boot 40 and a push-pull tab 50. The high-density fiber optic connector 20 also comprises buffered optical fibers 60 having bare optical fibers 61 therein, wherein buffer coatings 62 are coated on the bare optical fibers 61.

In an embodiment, the two-piece connector housing 21, configured for receiving the two buffered optical fibers 60, comprises an upper connector housing 22 and a lower connector housing 23. The upper connector housing 22 has two attachment knobs 28 disposed on two opposite back side ends thereof, respectively, and the lower connector housing 23 has two attachment arms 29 disposed on two opposite back side ends thereof, respectively. The two attachment arms 29 have pivot holes 29a on upper ends therethrough. The upper connector housing 22 rotatably connects to the lower connector housing 23 via the two attachment knobs 28 thereof, snap connecting to the two pivot holes 29a of the lower connector housing 23, respectively. The upper connector housing 22 and lower connector housing 23 opens and closes to form two separate housing through ports 24a, 24b when closed.

In an embodiment, the two separate housing through ports 24a, 24b, formed at a front end of the two-piece connector housing 21, are configured for receiving two separate connection ends 48a, 48b of the two sub-assembly housings 30a, 30b, respectively. The two separate housing through ports 24a, 24b both comprise housing recesses 24c, 24d therein, respectively. The two sub-assembly housings 30a, 30b slidably connect to the two-piece connector housing 21 via the connection ends 48a, 48b, slidably fitting into the housing recesses 24c, 24d at the housing through ports 24a, 24b of the two-piece connector housing 21, respectively. The two-piece connector housing 21 further comprises upper housing runners 26 on both sides of the upper connector housing 22, respectively, and lower housing runners 27 on both sides of the lower connector housing 23, respectively. The two sub-assembly housings 30a, 30b can be engaged in and fixed in the housing through ports 24a, 24b of the two-piece connector housing 21.

In an embodiment, the two-piece connector housing 21 further comprises a positioning guide 25, disposed on a top surface of the upper connector housing 22, having side protrusions 37 on each longitudinal side thereof. The side protrusions 37 comprise side protrusion hooks 38 disposed on upper edges thereof, protruding horizontally thereout. The upper surfaces of the side protrusion hooks 38 extend downward and outward from the positioning guides 25, respectively, forming a bevel shape. Additionally, in an embodiment, a tubular structure (not labeled) can be disposed at an end of the upper connector housing 22 for the buffered optical fibers 60 to be extended therethrough from the cable boot 40. The tubular structure would additionally set and fix the two buffered optical fibers 60.

In an embodiment, the cable boot 40 has a front attachment end 41 and a boot end 42 having a cable boot through put 42a, extending rearward from a back end of the front attachment end 41, configured for slidably connecting the cable boot 40 to the two-piece connector housing 21 having the buffered optical fiber 60 set and extended therethrough.

In an embodiment, the front attachment end 41 is U-shaped and has two lateral arms 43 on both sides thereof. The two lateral arms 43 both have upper edge rails 44 and lower edge rails 45 on inner wall surfaces thereof, respectively. The front attachment end 41 is slidably connected to the two-piece connector housing 21 via the upper and lower edge rails 44, 45 thereof and upper and lower housing runners 26, 27 of the two-piece connector housing 21 having the sub-assembly housings 30a, 30b connected thereto, respectively. The upper and lower connector housings 22, 23 are secured shut by the slidable connection between the upper and lower edge rails 44, 45 of the two lateral arms 43 and the upper and lower housing runners 26, 27 thereof.

In an embodiment, the push-pull tab 50 provides a means to connect and disconnect the high-density fiber optic connector 20. The push-pull tab 50 comprises a push-pull body 51 having a handle 52 disposed on a back end thereof and two support protrusions 53 disposed on opposite front side ends thereof, respectively. The push-pull body 51 further comprises an oval opening 54 therethrough and two rectangular guide openings 56 disposed on front top side ends thereof. An inner ledge 58 is disposed surrounding an upper sidewall of the push-pull body 51 and has two guide grooves 57 disposed on two opposite longitudinal sides thereof.

Figure 7B:
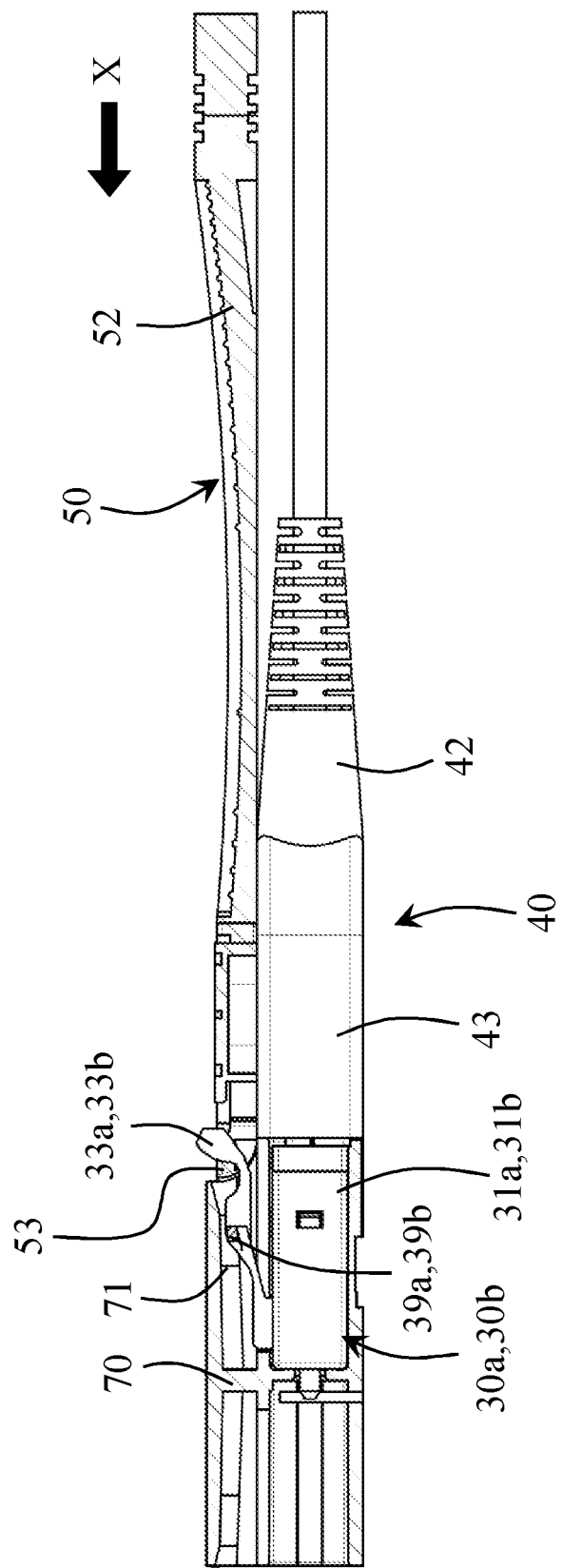
FIG. 7B is a cross-sectional view illustrating a high-density fiber optic connector, illustrating attachment of the push-pull tab when connecting to housing levers according to various embodiments.
Figure 8A:
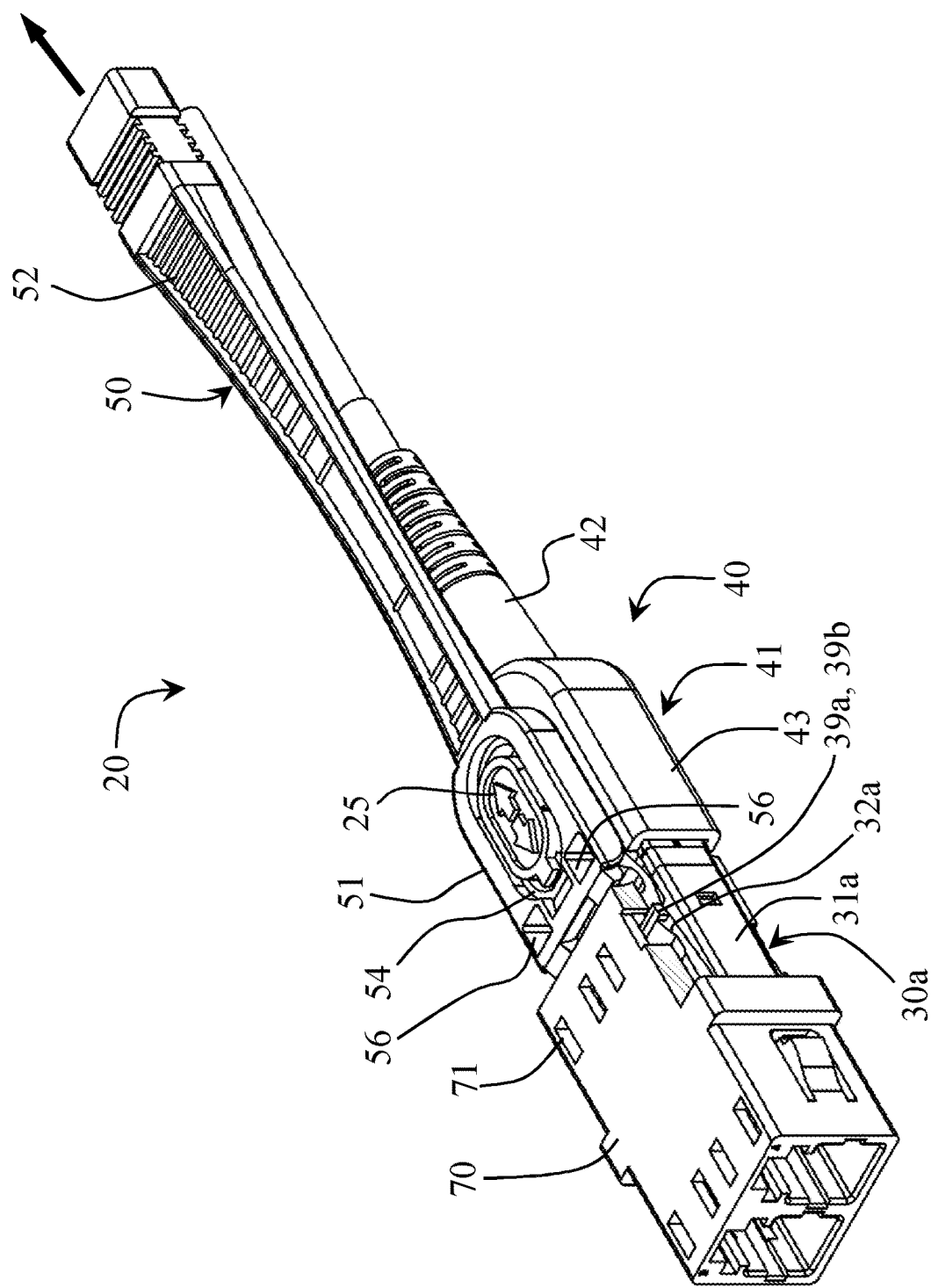
FIG. 8A is a perspective view illustrating a high-density fiber optic connector, illustrating disengagement of the push-pull tab when disconnecting from housing levers according to various embodiments.
Figure 8B:
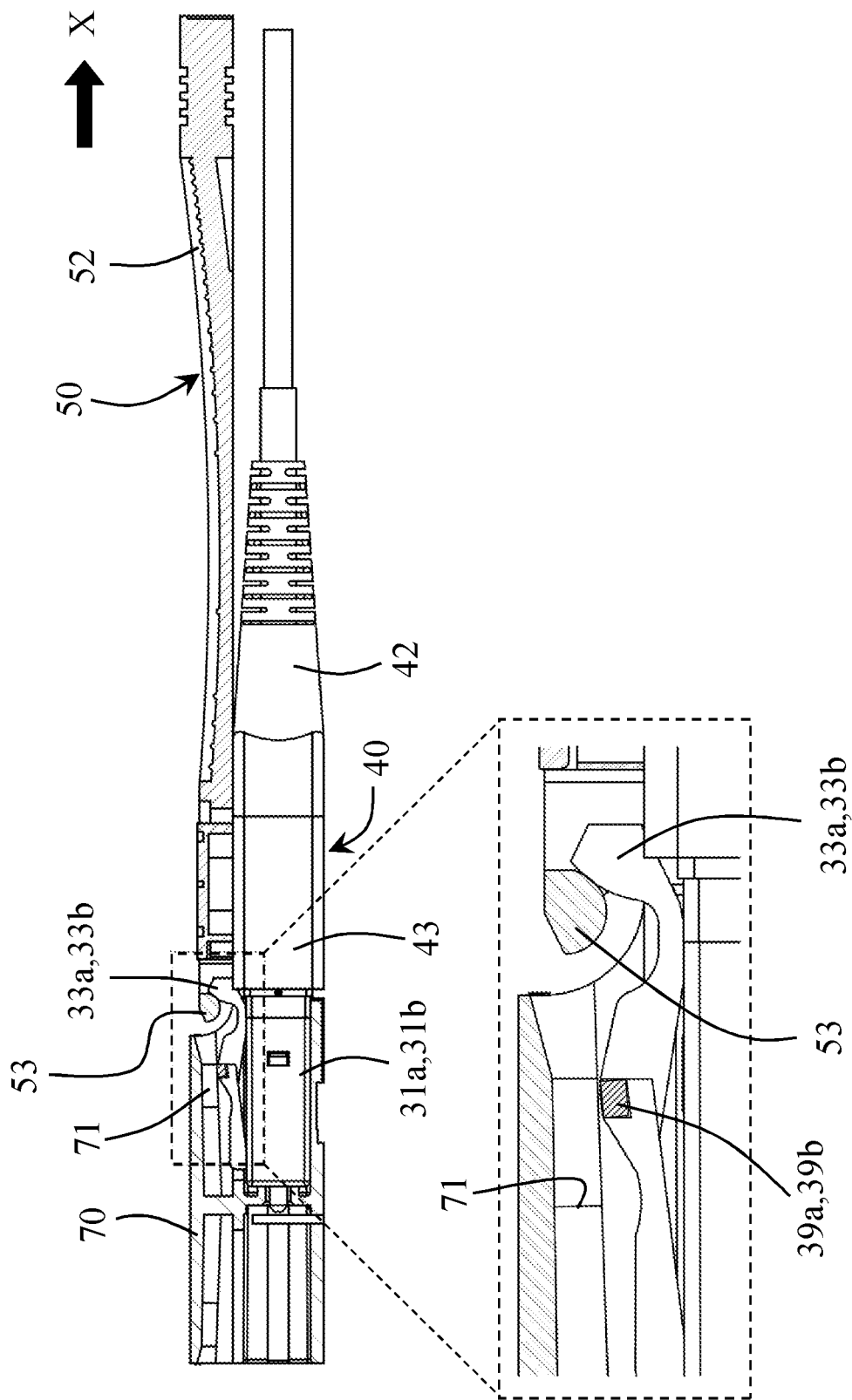
FIG. 8B is a cross-sectional view illustrating a high-density fiber optic connector, illustrating disengagement of the push-pull tab when disconnecting from housing levers according to various embodiments.

In an embodiment, the length (maximum length) of the oval opening 54 is larger than the length (maximum length) of the positioning guide 25 and the widths of the two guide grooves 57 of the inner ledge 58 are larger than the side protrusions 37 of the positioning guide 25. The oval opening 54 slidably connects with the positioning guide 25 of the upper connector housing 22 via alignment with the side protrusions 37 of the positioning guide 25 and the two guide grooves 57 thereof. When the oval opening 54 is pushed downward onto the positioning guide 25 of the upper connector housing 22, the upper surfaces of the side protrusion hooks 38 of the positioning guide 25 slide along the two guide grooves 57 of the inner ledge 58 for slidable snap connection therebetween. When slidably snap connected, the bottom of the side protrusion hooks 38 rests upon the top of the inner ledge 58 forming a stable structure between the push-pull body 51 and the positioning guide 25 of the upper connector housing 22. Once slidably snap connected, horizontal forward and backward movement of the positioning guide 25 of the upper connector housing 22 can be controlled by the push-pull tab 50, as shown in FIG. 7A and FIG. 7B, a cross-sectional view illustrating a high-density fiber optic connector, illustrating attachment of the push-pull tab when connecting to housing levers according to various embodiments and FIG. 8A a perspective view illustrating a high-density fiber optic connector, illustrating disengagement of the push-pull tab when disconnecting from housing levers according to various embodiments and FIG. 8B, a cross-sectional view illustrating a high-density fiber optic connector, illustrating disengagement of the push-pull tab when disconnecting from housing levers according to various embodiments.

In an embodiment, the two sub-assembly housings 30a, 30b both further comprise housing bodies 31a, 31b, respectively. Two ferrules 46a, 46b can be disposed through the inside of the housing bodies 31a, 31b and can be different colors. As an example, but not to be limiting, one of the two ferrules 46a, 46b can be red and the other can be black, or other colors can be used to indicate a fiber optic signal transmission terminal or fiber optic signal receiving terminal, respectively. When the two ferrules 46a, 46b are disposed through the inside of the housing bodies 31a, 31b, the back ends thereof are exposed at the back of the connection ends 48a, 48b of the two sub-assembly housings 30a, 30b, respectively. In an embodiment, the bare optical fibers 61 of the buffered optical fiber 60 can be disposed through the two ferrules 46a, 46b, respectively.

In an embodiment, two housing levers 32a, 32b are disposed on a forward top surface of the housing bodies 31a, 31b, respectively, flaring backward therefrom. The two housing levers 32a, 32b are integrally formed with the housing bodies 31a, 31b at front ends thereof, respectively. The back flared ends of the housing levers 32a, 32b are suspended above the back top surface of the housing bodies 31a, 31b, respectively, and are flexible. The housing levers 32a, 32b further comprise structural protrusions 33a, 33b disposed on the back of the flared ends thereof and lever grooves 34a, 34b thereaside, respectively. The housing levers 32a, 32b further comprise housing latches 39a, 39b, horizontally disposed across front ends of the lever grooves 34a, 34b opposite the back ends thereof. In an embodiment, the housing latches 39a, 39b and structural protrusions 33a, 33b can be flexed downwardly.

In an embodiment, the two sub-assembly housings 30a, 30b slidably connect to the two-piece connector housing 21 having the upper and lower connector housings 22, 23, via the connection ends 48a, 48b, slidably fitting into the housing recesses 24c, 24d at housing through ports 24a, 24b of the two-piece connector housing 21, respectively. Also, the push-pull tab 50 is assembled to the upper connector housing 22 of the two-piece connector housing 21 via the oval opening 54 of the push-pull body 51 of the push-pull tab 50, slidably connecting to the positioning guide 25 of the upper connector housing 22. When assembled, the structural protrusions 33a, 33b disposed on the back of the flared ends of the housing levers 32a, 32b protrude upward and outward through the rectangular guide openings 56 of the upper surface of the push-pull body 51. Also, the two support protrusions 53 disposed on opposite ends of the front side end of the push-pull body 51 sit on top back edges of the lever grooves 34a, 34b of the housing levers 32a, 32b, respectively.

Figure 6:
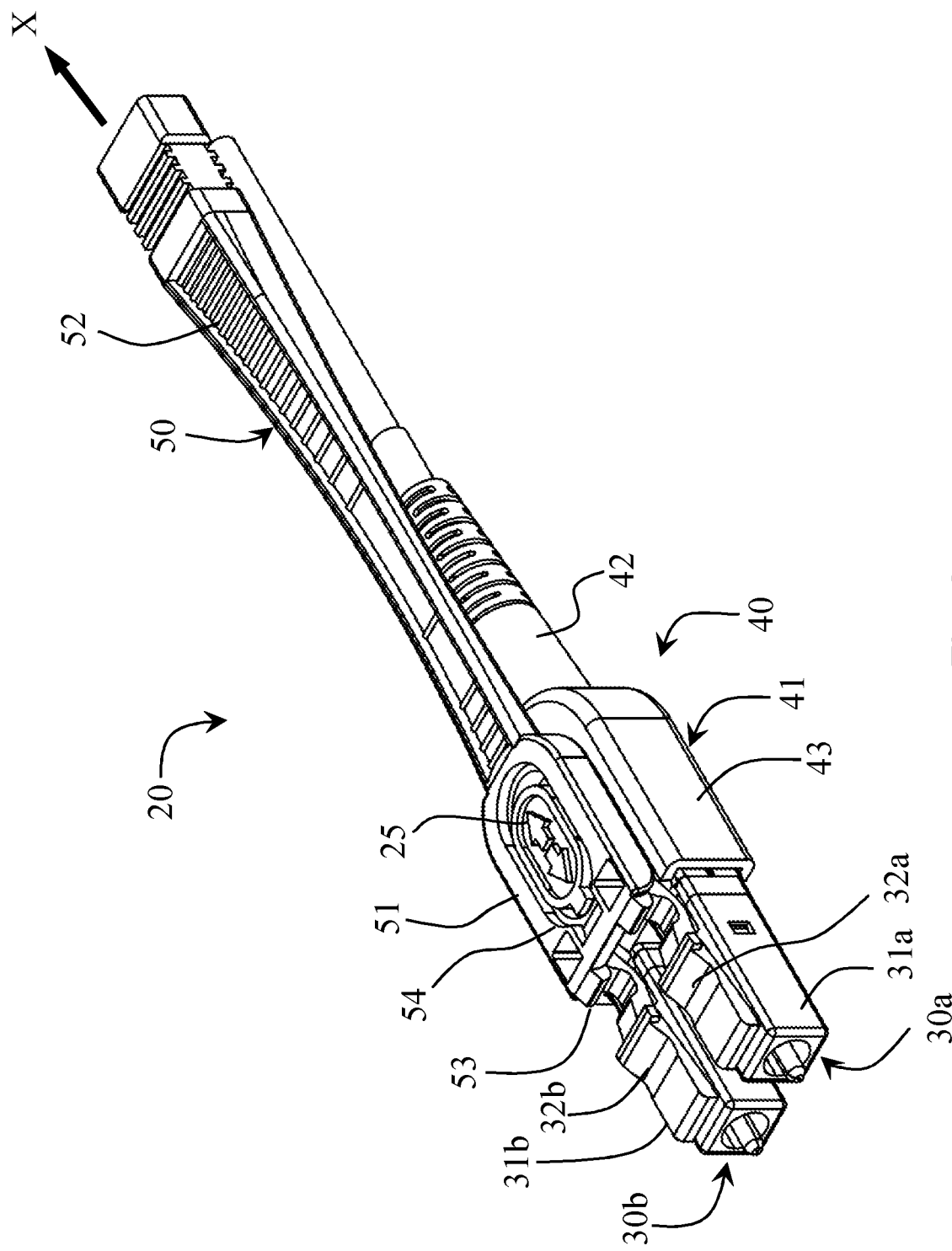
FIG. 6 is a perspective view illustrating a high-density fiber optic connector, illustrating backward detachment of the push-pull tab along a positioning guide according to various embodiments.

FIG. 6 is a perspective view illustrating a high-density fiber optic connector, illustrating backward detachment of the push-pull tab along a positioning guide according to various embodiments. As shown in FIG. 6, in an embodiment, when a pulling force is applied to the handle 52 of the push-pull tab 50 in the backward X direction, a predetermined distance is moved until the oval opening 54 abuts the front side of the positioning guide 25. Thereafter, the structural protrusions 33a, 33b, disposed on the back of the flared ends of the housing levers 32a, 32b, are retracted down into the rectangular guide openings 56 and the two support protrusions 53 disposed on opposite ends of the front side end of the push-pull body 51 move by the predetermined distance until it abuts front edge surfaces of the structural protrusions 33a, 33b, respectively. When the pulling force on the handle 52 of the push-pull tab 50 in the backward X direction is released, upward elastic forces of the flared ends of the housing levers 32a, 32b allow the structural protrusions 33a, 33b, disposed on the back of the flared ends of the housing levers 32a, 32b to return back to its original position.

Referring again to FIG. 7A and FIG. 7B, as shown, in an embodiment, the two sub-assembly housings 30a, 30b of the high-density fiber optic connector 20 can be mounted in a dual fiber optic cable adapter 70 of a high-density optical fiber system to be coupled and connected therein. The dual fiber optic cable adapter 70 comprises a plurality of adaptor latch orifices 71. In an embodiment, when assembled, and a pushing force is applied to the handle 52 of the push-pull tab 50 in the forward X direction, the two sub-assembly housings 30a, 30b respectively snap into accommodating slots of the dual fiber optic cable adapter 70. The front ends of the two housing levers 32a, 32b, respectively, abuts the accommodating slots of the dual fiber optic cable adapter 70 as the structural protrusions 33a, 33b and the housing latches 39a, 39b are forced downward such that structural protrusions 33a, 33b, disposed on the back of the flared ends of the housing levers 32a, 32b, are retracted down into the rectangular guide openings 56. As the pushing force is further applied to the handle 52 of the push-pull tab 50 in the forward X direction, the housing latches 39a, 39b are respectively moved to the bottom of the plurality of adaptor latch orifices 71 before snapping upward therein, due to upward elastic forces of the flared ends of the housing levers 32a, 32b. The two sub-assembly housings 30a, 30b of the high-density fiber optic connector 20 are mounted in the dual fiber optic cable adapter 70 of the high-density optical fiber system as the housing latches 39a, 39b are respectively positioned within the plurality of adaptor latch orifices 71.

Figure 7C:
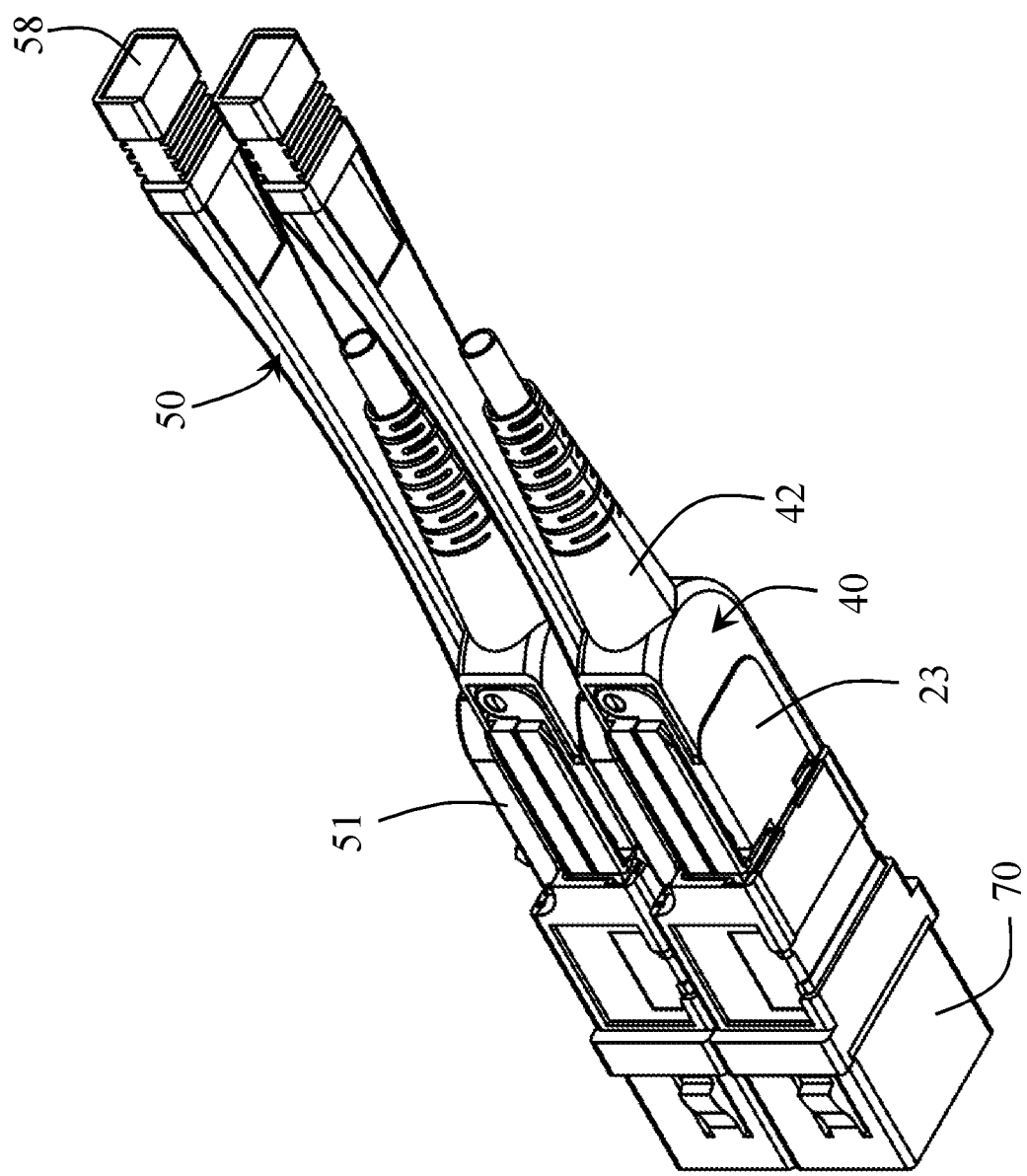
FIG. 7C is a bottom perspective view illustrating a high-density fiber optic connector according to various embodiments.

FIG. 7C is a bottom perspective view illustrating a high-density fiber optic connector according to various embodiments. As shown, in an embodiment, indicator areas 58, respectively, can be disposed on a back side end of the handle 52 of the push-pull tab 50. As an example, but not to be limiting, information related to a high-density fiber optic connector 20, such as a representative number, date and time, color, or other information can be attached or written to the indicator areas, respectively.

Referring again to FIG. 8A and FIG. 8B, as shown, in an embodiment, when a pulling force is applied to the handle 52 of the push-pull tab 50 in the backward X direction, the rectangular guide openings 56 are moved backward, respectively, for a predetermined distance until the oval opening 54 abuts the front side of the positioning guide 25. The two support protrusions 53 disposed on opposite ends of the front side end of the push-pull body 51, abut front edge surfaces of the structural protrusions 33a, 33b, respectively, and the structural protrusions 33a, 33b, disposed on the back of the flared ends of the housing levers 32a, 32b and the housing latches 39a, 39b, are retracted down into the rectangular guide openings 56 and retracted down from the plurality of adaptor latch orifices 71, respectively, to detach the high-density fiber optic connector 20 from the dual fiber optic cable adaptor 70.

Referring again to FIG. 7A and FIG. 7B, when the two sub-assembly housings 30a, 30b of the high-density fiber optic connector 20 are mounted in the dual fiber optic cable adapter 70, the housing latches 39a, 39b are respectively positioned within the plurality of adaptor latch orifices 71 of the dual fiber optic cable adapter 70. Meanwhile, referring again to FIG. 8A, when the two sub-assembly housings 30a, 30b of the high-density fiber optic connector 20 are disengaged from the dual fiber optic cable adapter 70, the housing latches 39a, 39b are respectively retracted downward and outward from the plurality of adaptor latch orifices 71 of the dual fiber optic cable adapter 70.

In the embodiments, a slight pushing force or pulling force is required to move the handle 52 of the push-pull tab 50 in the forward or backward X directions, respectively, due to the same direction of movement for operation of the support protrusions 53 and rectangular guide openings 56. In other embodiments, the design of the side walls of the rectangular guide openings 56 may further facilitate disengagement of the structural protrusions 33a, 33b therefrom when the support protrusions 53 are pressed downward. Additionally, in the embodiments, efficiency is increased as both of the sub-assembly housings 30a, 30b are interchangeable. As an example, but not to be limiting, an originally configured fiber optic signal transmission terminal can be reconfigured to be a fiber optic signal receiving terminal and an originally configured fiber optic signal receiving terminal side can be reconfigured to be a fiber optic signal transmission terminal.

Figure 9:
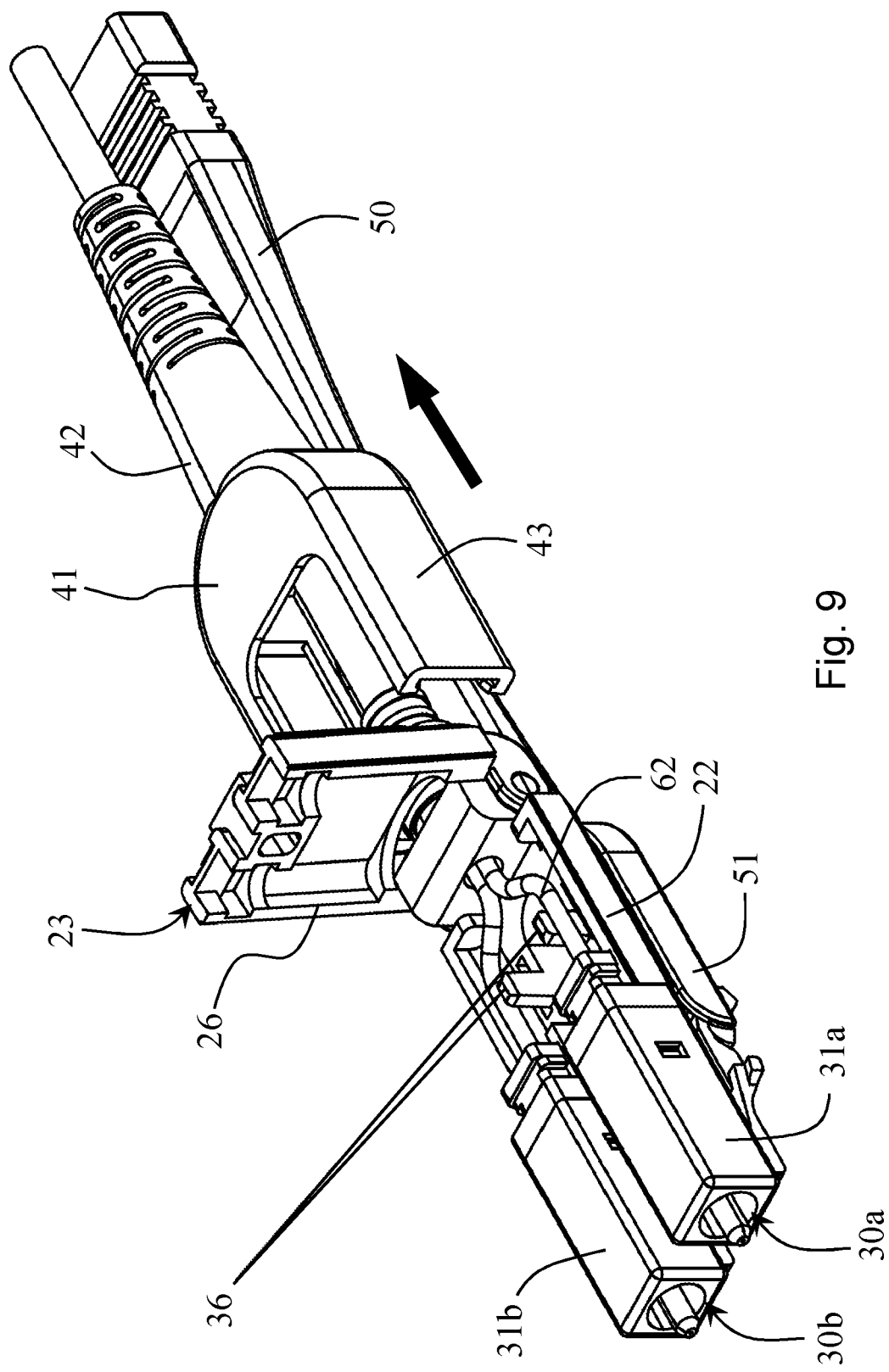
FIG. 9 is a perspective view illustrating a dual high-density fiber optic connector according to various embodiments.

FIG. 9 is a perspective view illustrating a dual high-density fiber optic connector according to various embodiments. As shown in FIG. 9, in an embodiment, the upper connector housing 22 further comprises spacing guides 36 to assure a predetermined length of the buffered optical fibers 60 when being manually assembled and prevent damage and pulling when the sub-assembly housings 30a, 30b are being interchanged.

In an embodiment, to interchange the sub-assembly housings 30a, 30b, the high-density fiber optic connector 20 is rotated 180 degrees such that the lower connector housing 23 is facing upward. Thereafter, the cable boot 40 is pulled backward and outward, disengaging the front attachment end 41 with the two-piece connector housing 21. Next, the lower connector housing 23 is rotatably opened and the sub-assembly housings 30a, 30b are interchanged dependent upon optical fiber system requirements.

Figure 10A:
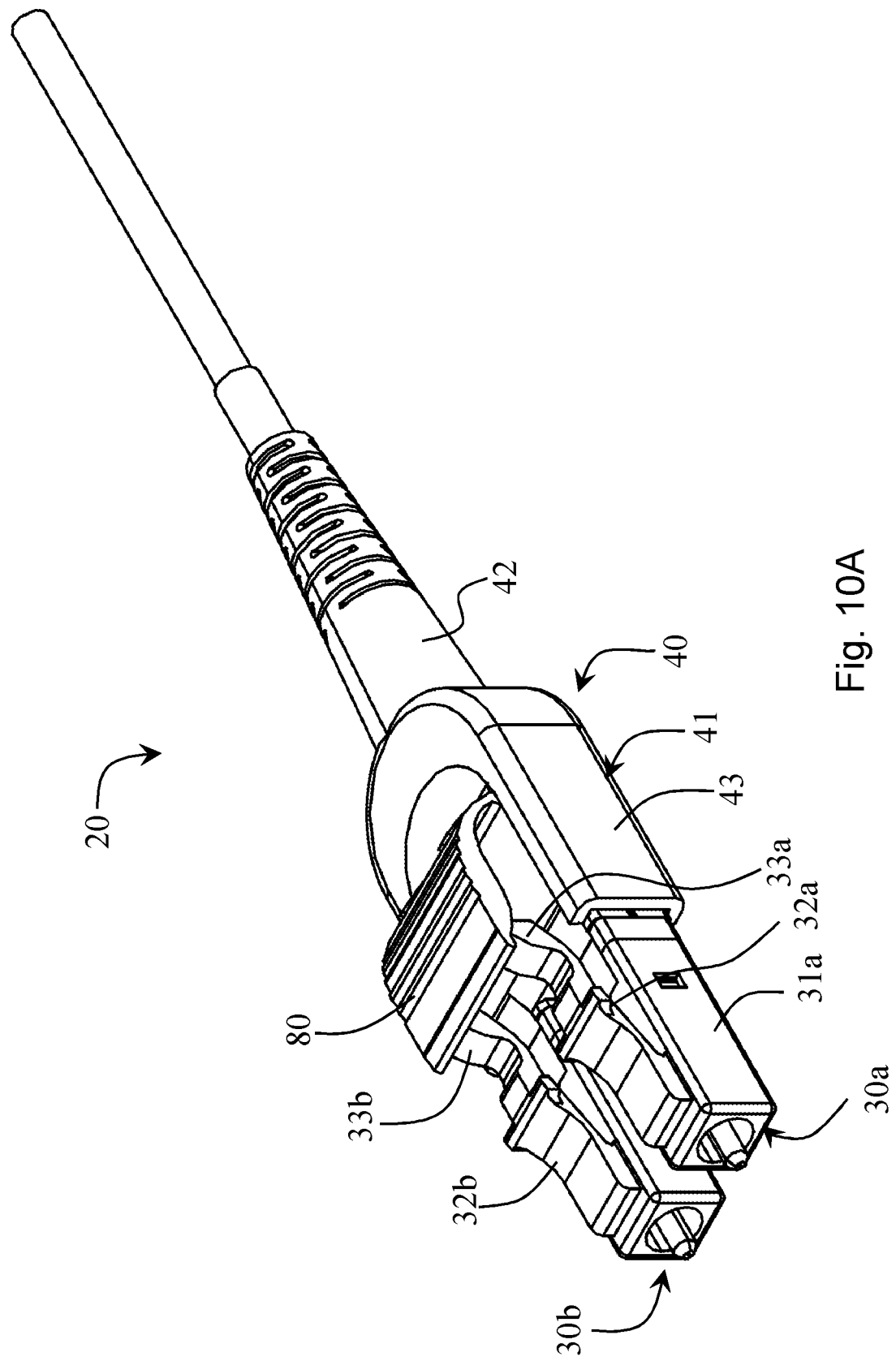
FIG. 10A is a perspective view illustrating another high-density fiber optic connector according to various embodiments.
Figure 10B:
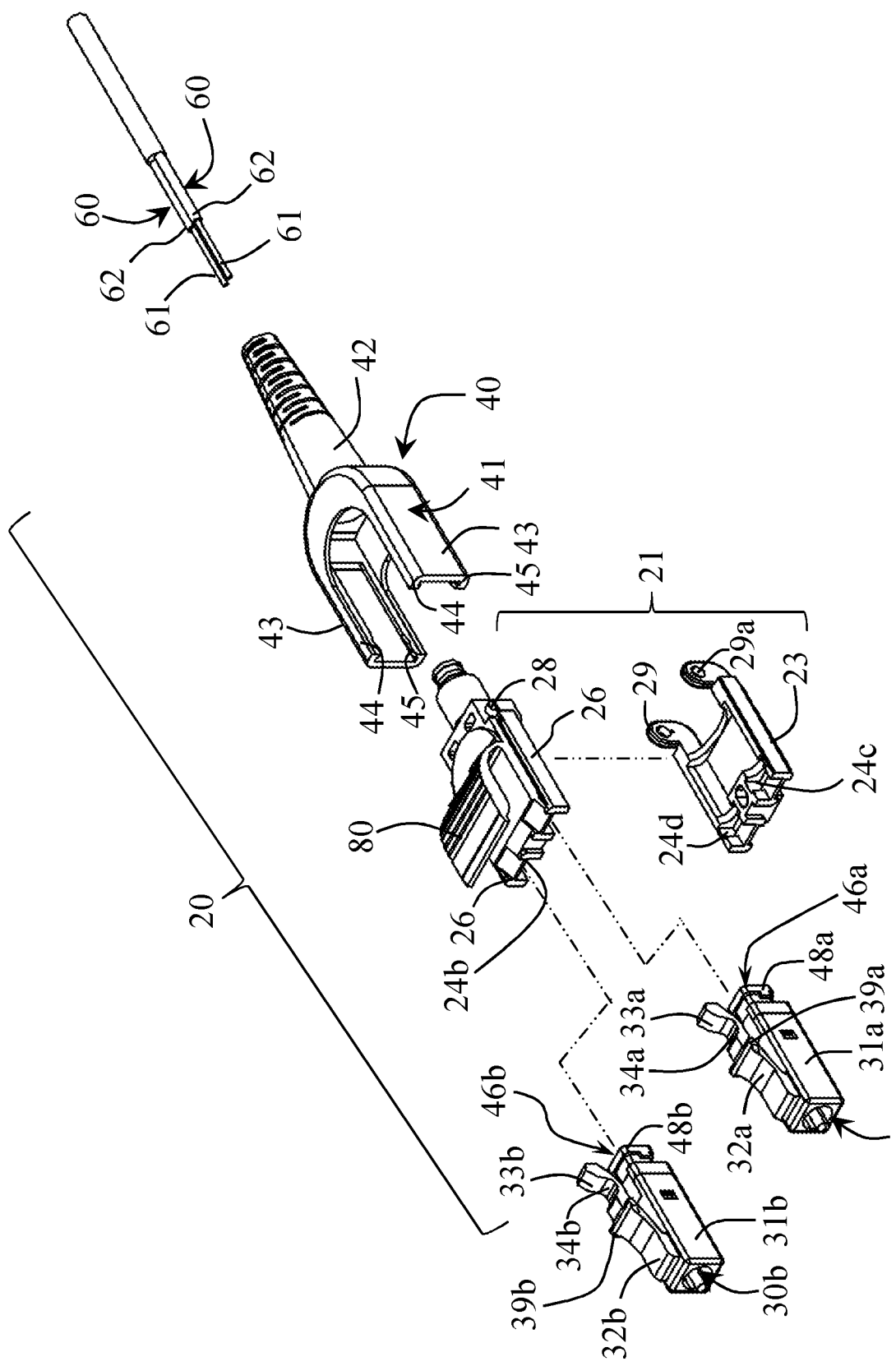
FIG. 10B is an exploded view illustrating another high-density fiber optic connector according to various embodiments.

FIG. 10A is a perspective view illustrating another high-density fiber optic connector according to various embodiments and FIG. 10B is an exploded view illustrating another high-density fiber optic connector according to various embodiments. As shown in FIGS. 10A and 10B, and referring to FIGS. 3-9, in another embodiment, the structure of the high-density optical fiber systems are similar, except for no use of the push-pull tab 50 and positioning guide 25. In another embodiment, the upper connector housing 22 comprises a flexible latch 80 disposed on a top surface thereof. The flexible latch 80 is integrally formed with the upper connector housing 22, wherein a bottom portion area thereof is disposed on a top portion of the upper connector housing 22 and a flexible curved overhang portion is suspended above the bottom portion area. In an embodiment, when the high-density fiber optic connector 20 is assembled, a front edge end of the flexible curved overhang portion of the flexible latch 80 is in direct contact with the top of the structural protrusions 33a, 33b disposed on the back of the flared ends of the housing levers 32a, 32b.

In an embodiment, assembly of the high-density fiber optic connector 20 to the dual fiber optic cable adaptor 70 comprises first, application of a forward pushing force applied to the end of the latch release 80, such that the two sub-assembly housings 30a, 30b respectively snap into accommodating slots of the dual fiber optic cable adapter 70. The front ends of the two housing levers 32a, 32b, respectively, abuts the accommodating slots of the dual fiber optic cable adapter 70 as the structural protrusions 33a, 33b and the housing latches 39a, 39b are forced downward such that structural protrusions 33a, 33b, disposed on the back of the flared ends of the housing levers 32a, 32b, are snapped to accommodating positions with the latch release 80. As the pushing force is continued to be applied to the end of the latch release 80, the housing latches 39a, 39b are respectively moved to the bottom of the plurality of adaptor latch orifices 71 before snapping upward therein, due to upward elastic forces of the flared ends of the housing levers 32a, 32b. The two sub-assembly housings 30a, 30b of the high-density fiber optic connector 20 are mounted in the dual fiber optic cable adapter 70 of the high-density optical fiber system as the housing latches 39a, 39b are respectively positioned within the plurality of adaptor latch orifices 71.

In an embodiment, disassembly of the high-density fiber optic connector 20 to the dual fiber optic cable adaptor 70 comprises first, a downward pushing force applied to the end of the latch release 80. The downward pushing force also pushes the protruding structural support 33a, 33b of the housing levers 32a, 32b downward, such that the housing latches 39a, 39b, are retracted down from the plurality of adaptor latch orifices 71, respectively, to detach the high-density fiber optic connector 20 from the dual fiber optic cable adaptor 70.

From the foregoing it will be appreciated that, although specific embodiments have been described herein for purposes of illustration, various modifications can be made without deviating from the spirit and scope of the disclosure. Furthermore, where an alternative is disclosed for a particular embodiment, this alternative can also apply to other embodiments even if not specifically stated.

What is claimed is:

1. A high-density fiber optic connector configured to operate with optical fiber cables, and a fiber optic cable adapter, comprising:
a first sub-assembly housing having a first housing body, wherein the first housing body comprises a first housing lever disposed on a forward top surface thereof, flaring backward therefrom, having a first structural protrusion disposed on a back end thereof, wherein the first structural protrusion is suspended above a back top surface of the first housing body and is flexible; and
a connector housing having an upper connector housing comprising a flexible latch disposed on a top surface thereof and a lower connector housing, wherein a bottom portion of the flexible latch is disposed on the top surface of the upper connector housing and a flexible curved overhang portion is suspended thereabove, wherein the upper and lower connector housings are rotatably connected at two opposite back side ends thereof, respectively, to open and close and form a first housing through port at a front end thereof,
wherein the first sub-assembly housing is engaged and fixed in the first housing through port, a back end thereof is coupled to and connected to a first optical fiber cable extending therein and therethrough, respectively, and a front end thereof is coupled to and connected to a first receiving port of the fiber optic cable adapter, and
wherein a front bottom edge end of the flexible curved overhang portion of the flexible latch is in direct contact with a top end of the first structural protrusion of the first housing lever, such that when a pushing force is applied to the flexible latch, the first structural protrusion is moved downward.

2. The high-density fiber optic connector of claim 1, wherein the connector housing further comprises a first upper housing runner and a first lower housing runner on one side thereof, and a second upper housing runner and a second lower housing runner on an opposite side thereof, wherein a front attachment end of a cable booth is slidably connected thereto, thereby, securing shut the upper and lower connector housings of the connector housing.

3. The high-density fiber optic connector of claim 2, wherein the front attachment end comprises a first lateral arm on one side thereof and a second lateral arm on an opposite side thereof, and the first lateral arm comprises a first upper edge rail and a first lower edge rail on an inner wall surface thereof, and the second lateral arm comprises a second upper edge rail and a second lower edge rail on an inner wall surface thereof, wherein the front attachment end of the cable booth is slidably connected to the connector housing thereby, securing shut the upper and lower connector housings of the connector housing.

4. The high-density fiber optic connector of claim 2, wherein the front attachment end is U-shaped and has a first lateral arm on one side thereof and a second lateral arm on an opposite side thereof, and the first lateral arm comprises a first upper edge rail and a first lower edge rail on an inner wall surface thereof, and the second lateral arm comprises a second upper edge rail and a second lower edge rail on an inner wall surface thereof, wherein the front attachment end of the cable booth is slidably connected to the connector housing thereby, securing shut the upper and lower connector housings of the two-piece connector housing.

5. The high-density fiber optic connector of claim 1, further comprising:
a second sub-assembly housing having a second housing body,
wherein the second housing body comprises a second housing lever disposed on a forward top surface thereof, flaring backward therefrom, having a second structural protrusion disposed on a back end thereof, wherein the second structural protrusion is suspended above a back top surface of the second housing body and is flexible,
wherein the upper and lower connector housings of the connector housing open and close to further form a second housing through port at a front end thereof,
wherein the second sub-assembly housing is engaged and fixed in the second housing through port, a back end thereof is coupled to and connected to a second optical fiber cable extending therein and therethrough, and a front end thereof is coupled to and connected to a second receiving port of the fiber optic cable adapter, and
wherein a front bottom edge end of the flexible curved overhang portion of the flexible latch is in direct contact with a top end of the second structural protrusion of the second housing lever, such that when a pushing force is applied to the flexible latch, the second structural protrusion is moved downward.

6. The high-density fiber optic connector of claim 5, wherein when the lower connector housing is facing upward and rotatably opened, the first and second sub-assembly housings can be manually interchanged, such that the first sub-assembly housing is engaged and fixed in the second housing through port and a back end thereof is coupled to and connected to the first optical fiber cable extending therein and therethrough, and a front end thereof is coupled to and connected to the second receiving port of the dual fiber optic cable adapter, and the second sub-assembly housing is engaged and fixed in the first housing through port and a back end thereof is coupled to and connected to the second optical fiber cable extending therein and therethrough, and a front end thereof is coupled to and connected to the first receiving port of the dual fiber optic cable adapter.

7. The high-density fiber optic connector of claim 5, wherein the first and second housing levers further comprise first and second housing latches, horizontally disposed across front ends thereof and first and second lever grooves, disposed between the first and second housing latches and first and second structural protrusions, respectively, wherein the first and second housing latches, first and second lever grooves, and first and second structural protrusions are suspended above back top surfaces of the first and second housing bodies, respectively, and are flexible, and wherein the first housing latch is positioned within one of a plurality of adaptor latch orifices of the fiber optic cable adapter and the second housing latch is positioned within another of a plurality of adaptor latch orifices of the fiber optic cable adapter, and wherein when a downward pushing force pushes the first and second structural protrusions downward, the first and second housing latches are retracted down from the plurality of adaptor latch orifices, respectively, to detach the first and second sub-assembly housings from the fiber optic cable adaptor.

8. The high-density fiber optic connector of claim 5, wherein the first and second optical fiber cables are disposed through the connector housing and first sub-assembly housing and second sub-assembly housing, respectively, and wherein the upper connector housing further comprises two spacing guides, centrally disposed near longitudinal side ends thereof, to assure a predetermined length of the first optical fiber cable and second optical fiber cable when being manually assembled or interchanged.

9. The high-density fiber optic connector of claim 5, wherein the first sub-assembly housing and second sub-assembly housing further comprise a first connection end having a first ferrule and a second connection end having a second ferrule, respectively, and wherein the first ferrule and second ferrule are different colors.

10. The high-density fiber optic connector of claim 9, wherein the connector housing further comprises a first front housing recess and a second front housing recess in first and second housing through ports, respectively, receiving the first connection end and the second connection end of the first and second sub-assembly housings, respectively, therein.

11. The high-density fiber optic connector of claim 1, wherein the flexible latch is integrally formed with the upper connector housing of the connector housing.

12. A high-density fiber optic connector configured to operate with optical fiber cables, and an optic cable adapter, comprising:
   a first sub-assembly housing having a first housing body,
   wherein the first housing body comprises a first housing lever disposed on a forward top surface thereof, flaring backward therefrom, having a first structural protrusion disposed on a back end thereof, first housing latch, horizontally disposed across a front end thereof, and a first lever groove disposed between the first housing latch and first structural protrusion, wherein the first structural protrusion is suspended above a back top surface of the first housing body and is flexible,
   wherein the first sub-assembly housing is engaged and fixed in a connector housing, a back end thereof is coupled to and connected to a first optical fiber cable extending therein and therethrough, and a front end thereof is coupled to and connected to a first receiving port of the fiber optic cable adapter,
   wherein the first housing latch of the first housing lever is positioned within one of a plurality of adaptor latch orifices of the fiber optic cable adapter, and
   wherein when the first structural protrusion is moved downward, the first housing latch is retracted down from the one of a plurality of adaptor latch orifices, to detach the first sub-assembly housing from the fiber optic cable adaptor.

13. The high-density fiber optic connector of claim 12, further comprising:
   a connector housing having an upper connector housing comprising a flexible latch disposed on a top surface thereof and a lower connector housing, wherein a bottom portion of the flexible latch is disposed on the top surface of the upper connector housing and a flexible curved overhang portion is suspended thereabove, and wherein the upper and lower connector housings are rotatably connected at two opposite back side ends thereof, respectively, to open and close and form a first housing through port at a front end thereof,
   wherein the upper and lower connector housings of the connector housing open and close to form a first housing through port at a front end thereof, and
   wherein a front bottom edge end of the flexible curved overhang portion is in direct contact with a top end of the first structural protrusion of the first housing lever, and wherein a downward pushing force is applied to the flexible latch to move the first structural protrusion of the first housing lever downward.

14. The high-density fiber optic connector of claim 13, wherein the connector housing further comprises a first upper housing runner and a first lower housing runner on one side thereof, and a second upper housing runner and a second lower housing runner on an opposite side thereof, wherein a front attachment end of a cable booth is slidably connected thereto, thereby, securing shut the upper and lower connector housings of the connector housing.

15. The high-density fiber optic connector of claim 13, wherein the front attachment end comprises a first lateral arm on one side thereof and a second lateral arm on an opposite side thereof, and the first lateral arm comprises a first upper edge rail and a first lower edge rail on an inner wall surface thereof, and the second lateral arm comprises a second upper edge rail and a second lower edge rail on an inner wall surface thereof, wherein the front attachment end of the cable booth is slidably connected to the connector housing thereby, securing shut the upper and lower connector housings of the connector housing.

16. The high-density fiber optic connector of claim 13, wherein the front attachment end is U-shaped and has a first lateral arm on one side thereof and a second lateral arm on an opposite side thereof, and the first lateral arm comprises a first upper edge rail and a first lower edge rail on an inner wall surface thereof, and the second lateral arm comprises a second upper edge rail and a second lower edge rail on an inner wall surface thereof, wherein the front attachment end of the cable booth is slidably connected to the connector housing thereby, securing shut the upper and lower connector housings of the two-piece connector housing.

17. The high-density fiber optic connector of claim 13, further comprising:
   a second sub-assembly housing having a second housing body,
   wherein the second housing body comprises a second housing lever disposed on a forward top surface thereof, flaring backward therefrom, having a second structural protrusion disposed on a back end thereof, second housing latch, horizontally disposed across a front end thereof, and a second lever groove disposed between the second housing latch and second structural protrusion, wherein the second structural protrusion is suspended above a back top surface of the second housing body and is flexible,
   wherein the second sub-assembly housing is engaged and fixed in a connector housing, a back end thereof is coupled to and connected to a second optical fiber cable extending therein and therethrough, and a front end thereof is coupled to and connected to a second receiving port of the fiber optic cable adapter,
   wherein a front bottom edge end of the flexible curved overhang portion of the flexible latch is in direct contact with the top end of the second structural protrusion of the second housing lever and the second housing latch of the second housing lever is positioned within one of a plurality of adaptor latch orifices of the fiber optic cable adapter,
   wherein when a downward pushing force is applied to the flexible latch, the second structural protrusion is moved downward and the second housing latch is retracted down from the one of a plurality of adaptor latch orifices, to detach the second sub-assembly housing from the fiber optic cable adaptor, and wherein the upper and lower connector housings of the connector housing open and close to form a second housing through port at a front end thereof.

18. The high-density fiber optic connector of claim 17, wherein the first and second optical fiber cables are disposed through the connector housing and first sub-assembly housing and second sub-assembly housing, respectively, and wherein the upper connector housing further comprises two spacing guides, centrally disposed near longitudinal side ends thereof, to assure a predetermined length of the first optical fiber cable and second optical fiber cable when being manually assembled or interchanged.

19. The high-density fiber optic connector of claim 17, wherein the first sub-assembly housing and second sub-assembly housing further comprise a first connection end having a first ferrule and a second connection end having a second ferrule, respectively, and wherein the first ferrule and second ferrule are different colors.

20. The high-density fiber optic connector of claim 19, wherein the connector housing further comprises a first front housing recess and a second front housing recess in first and second housing through ports, respectively, receiving the first connection end and the second connection end of the first and second sub-assembly housings, respectively, therein.

* * * * *